(12) United States Patent
Walsh et al.

(10) Patent No.: US 6,471,897 B1
(45) Date of Patent: Oct. 29, 2002

(54) COMPOSITE ARTICLE AND METHOD OF MAKING SAME

(75) Inventors: John Peter Walsh, St. Charles, IL (US); Allen R. Hill; Thomas M. Ruffin, both of Laurel, MS (US)

(73) Assignee: Masonite Corporation, Tampa, FL (US)

( * ) Notice: Subject to any disclaimer, the term of this patent is extended or adjusted under 35 U.S.C. 154(b) by 0 days.

(21) Appl. No.: 09/420,737

(22) Filed: Oct. 20, 1999

Related U.S. Application Data

(60) Provisional application No. 60/107,059, filed on Nov. 4, 1998.

(51) Int. Cl.⁷ ................................................. B27N 3/20
(52) U.S. Cl. ...................... 264/109; 264/122; 428/537.1
(58) Field of Search ................................ 264/109, 122, 264/124; 156/62.2, 62.4, 308.6, 308.8; 428/537.1

(56) References Cited

U.S. PATENT DOCUMENTS

| | | | | |
|---|---|---|---|---|
| 2,211,951 A | | 8/1940 | Hershberger ................. 154/40 |
| 2,495,043 A | * | 1/1950 | Willet et al. ............. 156/308.6 |
| 2,639,994 A | * | 5/1953 | Wilson ........................ 264/124 |
| 3,888,813 A | | 6/1975 | Moult et al. ................ 260/29.3 |
| 4,003,873 A | | 1/1977 | Smith ........................... 260/38 |
| 4,025,454 A | | 5/1977 | Rouzier ....................... 252/182 |
| 4,061,620 A | | 12/1977 | Gillern ........................ 260/29.3 |
| 4,183,997 A | * | 1/1980 | Stofko ........................ 156/62.2 |
| 4,393,019 A | | 7/1983 | Geimer ........................ 264/83 |
| 4,433,120 A | | 2/1984 | Chiu ............................ 525/501 |
| 4,935,457 A | | 6/1990 | Metzner et al. ............... 524/14 |
| 4,937,024 A | | 6/1990 | Hickson ....................... 264/83 |
| 5,091,458 A | * | 2/1992 | Santoemma | |
| 5,134,023 A | | 7/1992 | Hsu ............................ 428/288 |
| 5,195,428 A | | 3/1993 | Gawlitta et al. ............... 100/73 |
| 5,217,665 A | | 6/1993 | Lim et al. ..................... 264/83 |
| 5,246,652 A | | 9/1993 | Hsu et al. .................... 264/109 |
| 5,367,040 A | * | 11/1994 | Teodorczyk | |
| 5,637,658 A | | 6/1997 | Teodorczyk ................. 525/480 |
| 5,646,219 A | | 7/1997 | Teodorczyk ................. 525/524 |
| 5,756,599 A | | 5/1998 | Teodorczyk ................. 525/491 |
| 6,132,656 A | | 10/2000 | Dodd .......................... 264/83 |

FOREIGN PATENT DOCUMENTS

| | | |
|---|---|---|
| GB | 417944 | 10/1934 |
| GB | 831174 | 3/1960 |
| JP | 61-215675 | * 9/1986 |

OTHER PUBLICATIONS

International Search Report in International (PCT) Application No. PCT/US99/24962 dated Feb. 16, 2000.
K. Walter, "Steam Pressing Experience from Operating Plants and Future Possibilities," pp. 79–91(Date Unknown).
T.M. Maloney, "Modern Particleboard and Dry Process Fiberboard Manufacturing," pp. 31–33 and 420–424 (1977).

* cited by examiner

*Primary Examiner*—Mathieu D. Vargot
(74) *Attorney, Agent, or Firm*—Liniak, Bernato & White, LLC

(57) ABSTRACT

Disclosed herein is a cellulosic composite article and steam injection press methods of making the same by combining a phenolic resin with cellulosic material to form a mixture and, thereafter, providing a catalyzing agent, such as aluminum chloride, to the mixture. As an alternative, the method may include the steps of combining a catalyzing agent with a cellulosic material to form a mixture and, thereafter, providing a phenolic resin to the mixture. The method further includes the steps of forming a mat from the catalyzing agent-containing mixture and consolidating the catalyzing agent-containing mat in a pressing apparatus under heat, steam, and pressure to form the consolidated cellulosic product.

9 Claims, No Drawings

US 6,471,897 B1

COMPOSITE ARTICLE AND METHOD OF MAKING SAME

CROSS-REFERENCE TO RELATED APPLICATION

This application claims the benefit of U.S. provisional patent application Serial No. 60/107,059 filed Nov. 4, 1998, the disclosure of which is hereby incorporated herein by reference.

BACKGROUND OF THE INVENTION

1. Field of the Invention

The invention relates generally to the production of consolidated cellulosic products and, more specifically, to the production of a consolidated cellulosic product using a steam injection pressing operation.

2. Brief Description of Related Technology

Synthetic resin adhesives, such as phenol-based resins, are widely used as binders in the manufacture of composite articles, such as consolidated cellulosic products (e.g., waferboard, chipboard, oriented strandboard, or fiberboard). Such composites may be formed by various processes and may be formed in a variety of desired shapes and sizes depending on the intended end use of the composites. Generally, however, consolidated cellulosic products are formed by combining a phenolic resin, such as a phenol-formaldehyde resin, with filler material, such as cellulosic fibers or cellulosic particles, and then bonding the filler material together in the presence of heat and pressure. Various processes are described in U.S. Pat. Nos. 5,367,040 and 5,637,658 and co-pending, commonly-assigned U.S. application Ser. No. 08/888,878 (filed Jul. 7, 1997), the disclosures of which are hereby incorporated herein by reference.

A principal process of making a consolidated cellulosic product is a "dry" process. In a dry process, filler material, such as cellulosic fibers, is generally conveyed in a gaseous stream or by mechanical means in a felting step. For example, the fibers supplied from a fiberizing apparatus (e.g., a pressurized refiner) may be coated with a thermosetting synthetic resin, such as a phenol-formaldehyde resin, in a blowline blending procedure, wherein the resin is blended with the fiber with the aid of air turbulence. Thereafter, the resin-coated fibers from the blowline can be randomly formed into a mat by air blowing the fibers onto a support member. Optionally, the fibers, either before or after formation of the mat, can be subjected to pre-press drying, for example in a tube-like dryer. The formed mat, typically having a moisture content of less than about 30 wt. % and preferably less than about 10 wt. %, is then pressed under heat and pressure to cure the thermosetting resin and to compress the mat into an integral consolidated structure. A "wet-dry" process uses water to convey the cellulosic material and binder, prior to one or more water removal, e.g. drying, steps.

Steam injection pressing is a consolidation step that can be used, for example, under certain circumstances in dry and wet-dry process production of consolidated cellulosic composites. In steam injection pressing, steam is injected through perforated heating press platens, into, through, and then out of a mat that includes the synthetic resin and the filler material. The steam condenses on surfaces of the filler and heats the mat. The heat transferred by the steam to the mat as well as the heat transferred from the press platens to the mat cause the resin to cure. When compared with conventional pressing operations, steam injection pressing may, under certain circumstances, provide a variety of advantages, such as, for example, shorter press time, a more rapid and satisfactory cure of thicker panels, and products having more uniform densities.

Steam injection pressing of mats containing conventional phenolic resins, however, often results in a final composite product exhibiting undesirable characteristics, such as poor bond formation and/or starved glue lines. In order to ensure good bond formation, it is desirable to have a uniform dispersion of the phenolic resin throughout the mat. However, because phenolic resins are water soluble, when mats containing such resins are steam pressed, the steam may condense and may solubilize the resin. The solubilized resin may undesirably migrate to regions of the mat such that the resin is no longer uniformly dispersed, resulting in a product that may have resin-starved regions and poor bond formation. Poor bond formation also is attributable to the known phenomena of pre-cure (i.e., where the resin cures before the mat has hardened to an integral consolidated structure) and moisture retardation (i.e., where water present in the core or interior of the mat prevents the mat temperature from exceeding the evaporation temperature of water, 100° C., thereby retarding the resin cure). Starved glue lines caused by excess penetration of the resin can occur near the surface of the formed product where resin has undesirably been washed from the surface of the mat and has migrated to edges of the mat or to the mat core. The absence of resin near the product's surface—hence, the presence of starved glue lines—causes flaking of the product.

In view of the foregoing, it would be desirable to provide a method of making a cellulosic product that overcomes the problems described above. More particularly, it would be desirable to provide a method of making a consolidated cellulosic products, using a conventional phenolic resin and a steam injection pressing operation, that retains the advantages and overcomes the disadvantages of prior methods of making cellulosic composites.

SUMMARY OF THE INVENTION

It is an object of the invention to overcome one or more of the problems described above.

Accordingly, the invention provides a cellulosic composite article and methods of making the same. Generally, the method includes the steps of combining a phenolic resin with cellulosic material to form a mixture, forming a mat from the mixture, and consolidating the mat under heat, steam, and pressure in a pressing apparatus to form the article. The method further includes the step of providing a catalyzing agent, such as aluminum chloride, to the mixture prior to the mat formation step to acid hydrolyze the polymeric molecules comprising the cellulosic material. As an alternative to these steps, the method may include the steps of combining a catalyzing agent, such as aluminum chloride, with a cellulosic material to form a mixture, forming a mat from the mixture, and consolidating the mat under heat, steam, and pressure in a pressing apparatus to form the article. In this alternative method, the method further includes the step of providing a phenolic resin to the mixture prior to the consolidation step.

Further objects and advantages of the invention may become apparent to those skilled in the art from a review of the following detailed description, taken in conjunction with the appended claims.

DETAILED DESCRIPTION OF THE INVENTION

According to the invention, a consolidated cellulosic article is made by combining a phenolic binder resin and a cellulosic material, such as cellulosic fibers or cellulosic particles. A mat is formed, and the mat is consolidated under heat, steam, and pressure in a steam injection pressing apparatus. A catalyzing agent, as described in greater detail below, is provided to the resin and/or cellulosic material, preferably prior to the mat consolidation stage. A dry process is preferably used.

According to a preferred method, a phenolic resin is combined with cellulosic material to form a first mixture, followed by providing a catalyzing agent, such as aluminum chloride, to the mixture. The catalyzing agent may be sprayed onto the phenolic resin/cellulosic material mixture by known expedients. The method further includes the steps of forming a mat from the catalyzing agent-containing mixture on a support member and introducing the mat into a pressing apparatus. The catalyzing agent-containing mat is consolidated under heat, steam, and pressure in the pressing apparatus to form a consolidated, integral article.

In another embodiment of the inventive method, a catalyzing agent, such as aluminum chloride, is initially combined with a cellulosic material to form a mixture, followed by providing a phenolic resin to the mixture. The phenolic resin may be sprayed onto the cellulosic material/catalyzing agent mixture. This method also includes the additional steps of forming a mat from the catalyzing agent-containing mixture on a support member and introducing the mat into a pressing apparatus. The catalyzing agent-containing mat is consolidated under heat, steam, and pressure in the pressing apparatus to form a consolidated, integral article.

In yet another embodiment, a phenolic resin and cellulosic material may be combined, mixed, and formed into a mat. The formed mat can be sprayed with a catalyzing agent, as described herein. Alternatively, the catalyzing agent might, in some cases, be applied with the saturated steam during the consolidation step. However, in this latter embodiment, it is believed that application of the catalyzing agent may be somewhat difficult due to a likely, yet undesirable, volatilization of the catalyzing agent.

The cellulosic filler used with the invention is preferably cellulosic fiber or cellulosic particles (e.g., chips, strands or flakes). Those of skill in the art will be able to select suitable filler materials.

Preferred resins for use in accordance with the invention include phenolic resins, including modified phenolic resins. While the phenolic resin may be in a powdered, high molecular weight form, the powdered form typically is more expensive to manufacture and, therefore, an aqueous form of the resin is generally preferred.

Many suitable phenolic resins are available commercially. Generally, a phenolic resin is a reaction product of a phenolic component and an aldehyde, the reaction occurring in the presence of an alkaline compound. The phenolic component of the phenolic resin for use in accordance with the invention may include phenol, cresol, xylenols, other substituted phenols, and/or mixtures thereof. Examples of substituted phenols include o-cresol, p-cresol, p-tertbutylphenol, p-nonylphenol, p-dodecylphenol, and bi-functional xylenols (e.g., 3,5-xylenols). A mixture of cresols, phenol, and xylenols (commonly known as cresylic acid) may be useful in accordance with a commercial scale practice of the inventive method due to its abundance and relatively low cost.

The aldehyde component of the phenolic resin for use in accordance with the invention is not limited to aldehyde itself, but encompasses any aldehyde, formaldehyde, and derivatives thereof which are known in the art to be useful in conjunction with the manufacture of phenolic resins. Thus, references herein to the aldehyde component of the resin include aldehydes, formaldehydes, and derivatives thereof Formaldehyde is the preferred aldehyde. Derivatives of formaldehyde include, for example, paraformaldehyde, hexamethylenetetramine, acetaldehyde, glyoxal, and furfuraldehyde.

By way of example, the ratio of the aldehyde component to the phenolic component may be in a range of about 2.0 moles aldehyde or less per mole of phenolic component, more specifically about 0.5 moles to about 1.2 moles aldehyde per mole of phenolic component, for example, about 0.8 moles to about 1.0 moles aldehyde per mole of phenolic component. If a bi-functional phenolic compound is used (e.g., 3,5-xylenols), the equivalent molar ratio (i.e., the ratio of moles of aldehyde to the number of free positions on the phenolic ring available for reaction with the aldehyde) can be in a range of about 0.4:1 to about 0.66:1. However, the invention is not limited to these ranges.

As noted above, formation of the phenolic resin for use in accordance with the invention occurs in the presence of an alkaline compound (sometimes referred to as "caustic") that is used: (a) to achieve methylolation of the phenol; (b) to speed the reaction between the aldehyde and phenolic compound; and, (c) to solubilize the formed resin. Various suitable alkaline compounds are known in the art, and include, for example, sodium hydroxide, potassium hydroxide, or mixtures thereof Although higher proportions of caustic may be used and those skilled in the art will be able to select suitable caustic levels, the amount of caustic added to the phenolic/aldehyde mixture may be in a range of about 0.05 moles to about 0.2 moles of alkaline compound per mole of phenolic compound. Such an amount of caustic generally assures very beneficial properties of the formed product while allowing for a sufficiently rapid resin cure.

Optionally, an amount of dihydroxybenzene modifier (e.g., resorcinol) may be added to the phenolic resin. Examples of dihydroxybenzenes include resorcinol, hydroquinone, and catechol. Unsubstituted and substituted resorcinols including mixtures thereof, also may be used. The reaction between the phenolic resin and the modifier preferably occurs without the further addition of caustic, until a desired chain length is reached to produce a modified phenolic resin. Though resorcinol is the preferred modifier compound, other modifier compounds that may be reacted with a phenol-formaldehyde resin include aminophenols and phenylenediamines. Examples of aminophenols include ortho-hydroxyaniline, meta-hydroxyanlline, and para-hydroxyaniline. Examples of phenylenediamines include ortho-phenylenediamine, meta-phenylenediamine, and para-phenylenediamine. When included, the modifier compound is preferably present in a range of about one mole to about ten moles of the phenol compound per mole of resorcinol, and preferably about five moles to about ten moles phenol per mole of resorcinol. The molar ratio of aldehyde to total phenolics (i.e., the phenolic components plus dihydroxybenzene modifier) is preferably greater than about 1:1, more preferably is in a range of about one mole to about 1.8 moles formaldehyde per mole of phenolics, and most preferably about 1.1 moles to about 1.4 moles formaldehyde per mole phenolics.

According to the invention, once a mat comprising the phenolic resin, cellulosic material, and catalyzing agent has been formed, the mat is introduced into a suitable pressing apparatus having perforated press platens and steam injection capability. Steam is injected into the mat through the press platens so as to cure the resin. The steam injection press apparatus may include press platens having apertures, one of the platens being used for injecting the steam through the apertures, and another platen (e.g., a bottom platen) being used to vent the steam or liquid condensate through the apertures. In such an embodiment, the steam may enter the top side of the mat evenly over its entire surface, then flow from the top surface to the bottom surface, and finally exit through the bottom platen. Alternatively, the steam may be injected and exhausted through the same (e.g., bottom) platen.

The pressure in the press is preferably in a range of about 100 pounds per square inch gauge (psig) to about 400 psig, and more preferably in a range of about 200 psig to about 300 psig. The temperature of the steam is preferably in a range of about 150° C. to about 200° C., while the press platens are preferably at a temperature of about 150° C. to about 210° C. Press times generally are relatively short, and are preferably in a range of about fifteen seconds to about five minutes, and more preferably about twenty seconds to about one minute, e.g. about thirty seconds. However, these press times, temperatures, and pressures may be adjusted depending upon the materials and apparatus being used. For example, as will be apparent to those having ordinary skill in the art, desirable press temperatures vary according to various factors, such as the thickness of the mat to be pressed, the type of cellulosic material being pressed, the moisture content of the cellulosic material, the desired press time, and the type of resin used.

Process parameters and apparatus for steam injection pressing are described more fully in K. Walter, *Steam Pressing Experience from Operating Plants and Future Possibilities*, (G. Siempelkamp Gmbh and Co.) and in U.S. Pat. Nos. 5,195,428; 5,134,023; and 4,890,849, the respective disclosures of which are incorporated herein by reference.

It has been found that the invention provides excellent cellulosic composite articles. An example of a suitable catalyzing agent includes aluminum chloride. While the invention is not limited by any particular theory, theories for the mechanism of the invention have been developed. For example, it is believed that the use of aluminum chloride may act on the cellulosic filler in providing excellent cellulosic composite articles. For example, aluminum chloride may behave independently of the resin binder, and act to cleave the polymeric backbone of the cellulosic filler material. Preferably an aqueous solution comprising about 0.2 weight percent to about 0.6 weight percent aluminum chloride based on the total weight of a mixture of phenolic resin binder and a cellulosic material. This cleaving, which may be referred to as acid hydrolysis of the cellulosic filler material, imparts improved machinability characteristics to the formed articles. The improved machinability characteristics include ease in cutting, routing, and shaping the formed article.

Heretofore it has been difficult, if not impossible, to obtain formed articles via steam injection press methods having a strength similar to boards formed by conventional press methods. However, it is believed that steam injection pressing according to the inventive method using an aluminum chloride imparts a strength to the formed article similar to that achieved by articles formed by conventional press methods, while at the same time providing the other advantages of steam injection. Additionally, the formed articles are further characterized by the substantial absence of fiber uplifting at the surface, (i.e., a smooth surface) as visually observed.

The invention provides other advantages. Thick board products that ordinarily would require lengthy press and resin cure periods now may be manufactured more efficiently (e.g., more quickly and using reduced press temperatures and/or pressures) according to the inventive steam injection press method. Such board products can have thicknesses of greater than about 0.5 inches (about 1.27 centimeters (cm)), preferably in a range of about 0.5 inches (about 1.27 cm) to about four inches (about 10.16 cm), and more preferably in a range of about one inch (about 2.54 cm) to about three inches (about 7.62 cm), e.g., about 2 inches (about 5.08 cm).

The inventive method may be used in the manufacture of cellulosic composite articles such as fiberboard (e.g., medium density fiberboard or hardboard), waferboard, oriented strandboard (OSB), plywood, and particleboard, including composites thereof (e.g., a multi-layer article having a first layer of OSB and an overlay of fiberboard). Preferred product applications include structural members, exterior and decorative trim pieces, shutters, soffits, door pediments (decorative areas surrounding a door), columns, exterior siding, and roofing. For some applications, the press platens preferably provide the final product with an embossed surface resembling natural wood.

As stated above, the use of phenolic resins in prior art steam injection pressing methods have produced composite products exhibiting undesirable characteristics, such as, for example, poor bond formation and/or starved glue lines. It has been determined that the undesirable characteristics may be attributed to various factors, such as resin wash-out, resin pre-cure, and moisture retardation. While the invention is not limited to any particular mechanism, the inventive method preferably overcomes these problems by incorporating a catalyzing agent, such as aluminum chloride.

The foregoing description is given for clearness of understanding only, and no unnecessary limitations should be understood therefrom, as modifications within the scope of the invention may be apparent to those skilled in the art.

What is claimed is:

1. A method of making a cellulosic composite article, the method comprising the steps of:

(a) combining a phenolic resin with cellulosic material to form a mixture;

(b) forming a mat from the mixture of step (a);

(c) consolidating the mat under heat, steam, and pressure in a pressing apparatus to form the article; and, (d) providing an aqueous solution of aluminum chloride to the mixture prior to step (c), wherein said solution provides about 0.2 weight percent to about 0.6 weight percent aluminum chloride based on the total weight of the mixture of step (a).

2. The method of claim 1, wherein the aqueous solution of aluminum chloride is provided to a first mixture of said phenolic resin and said cellulosic material.

3. A cellulosic composite article made by the method of claim 1.

4. A method of making a cellulosic composite article, the method cop rising the steps of:

(a) combining aluminum chloride with cellulosic material to form a mixture;

(b) forming a mat from the mixture of step (a);

(c) consolidating the mat under heat, steam, and pressure in a pressing apparatus to form the article; and, (d) providing a phenolic resin to the mixture prior to step (c), wherein of step (a) comprises combining about 0.2 weight percent to 0.6 weight percent aluminum chloride based on the total weight of the cellulosic material and resin.

5. The method of claim 4, wherein the phenolic resin is provided to a first mixture of aluminum chloride and cellulosic material.

6. A cellulosic composite article made by the method of claim 4.

7. A method of making a cellulosic composite article, the method comprising the steps of:

(a) combining a phenolic resin with cellulosic material to form a mixture, the cellulosic material comprising polymeric molecules;

(b) forming a mat form the mixture of step (a);

(c) consolidating the mat under heat, steam, and pressure in a pressing apparatus to form the article; and, (d) providing a catalyzing agent comprising aluminum chloride, to the mixture prior to step (c) to acid hydrolyze the polymeric molecules present in the cellulosic material.

8. The method of claim 7, wherein in step (d) about one mole or greater of the catalyzing agent per mole of caustic present in the phenolic resin is provided to the mixture.

9. A cellulosic composite article made by the method of claim 7.

* * * * *